United States Patent Office 3,218,516
Patented Nov. 16, 1965

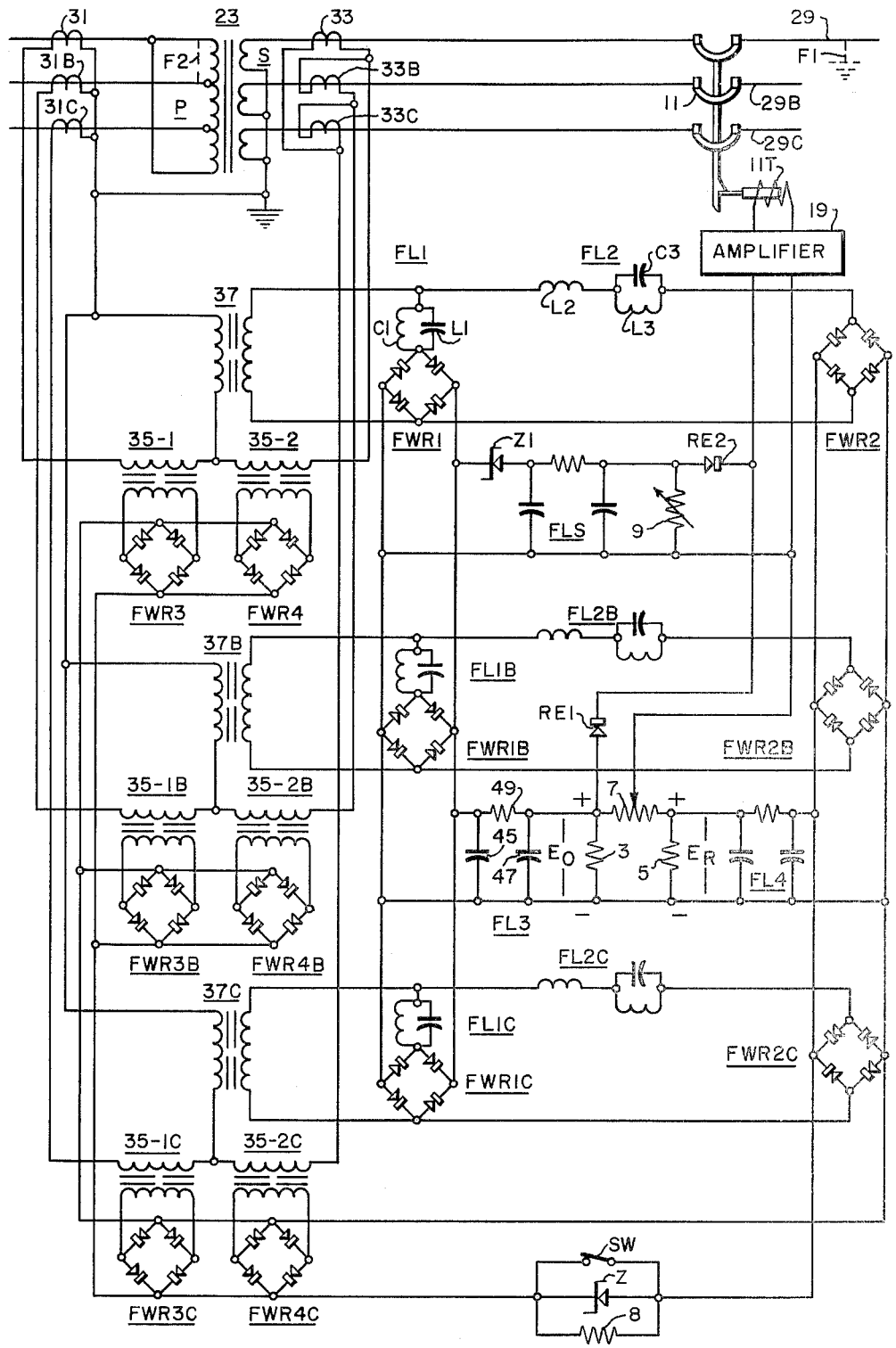

3,218,516
PROTECTIVE RELAYS
Robert L. Sharp, Pequannock, N.J., assignor to Westinghouse Electric Corporation, Pittsburgh, Pa., a corporation of Pennsylvania
Filed Oct. 22, 1962, Ser. No. 232,132
10 Claims. (Cl. 317—27)

This invention relates to protective relays and it has particular reference to protective differential relays employing static components.

A differential relay is employed for protecting an electrical system or electrical apparatus having terminals through which currents normally enter and leave the system or apparatus against internal faults. To this end the differential relay is designed to respond to the difference between currents entering and leaving through the terminals of the system or apparatus to be protected.

In some cases, an undesirable energization of the relay is obtained in the absence of an internal fault on the system or apparatus to be protected. For example, if the energization of the relay is derived from current transformers associated with the terminals of the system or apparatus to be protected different saturating characteristics of the transformers can result in an undesirable apparent differential output even though the primary currents of the transformers are the same. To guard against improper operation of the relay under these circumstances, it is the practice to restrain operation of the relay to a degree dependent on the sum of the currents entering and leaving the system or apparatus to be protected through the terminals. A differential relay employing such restraint is known as a percentage differential relay. A further safeguard against improper operation of the differential relay is through the utilization of a "flared" characteristic as described in the copending Sonnemann patent application, Serial No. 852,390, filed November 12, 1959, now Patent No. 3,160,787, and assigned to the same assignee.

For some applications it has been found desirable to design a differential relay to discriminate between certain temporary non-fault conditions of apparatus to be protected and fault conditions. For example, a differential relay should not respond to the normal magnetizing inrush currents of a transformer protected by the relay. Inasmuch as such inrush has a large second harmonic component of current, the relay may be made insensitive to such component as described in the copending patent application of R. L. Sharp and W. E. Glassburn, Serial No. 741,854 filed June 13, 1958, now Patent No. 3,144,590 and assigned to the same assignee.

In accordance with the invention, a differential relay is designed to respond to the difference between part only of a first alternating electrical quantity and preferably part only of a second alternating electrical quantity which include harmonic components for protecting alternating current systems or apparatus. First and second direct voltages are derived from the desired parts of the quantities. The difference between these direct voltages provides a third or difference direct voltage which is employed for energizing suitable protective translating means. In a preferred embodiment of the invention, the part of the first quantity excludes the second harmonic component and the part of the second quantity excludes the fundamental harmonic component. In addition, a "flared" characteristic may be employed in the present invention. Preferably, the part of the first quantity provides an instantaneous protective operation for large values of the first quantity. Static construction is provided for the preferred embodiment of the invention.

In a preferred embodiment of the invention a differential relay responds to the difference between first and second direct voltages for protecting alternating electric apparatus having terminals. The first direct voltage is dependent on components of internal alternating fault current flowing in the apparatus other than the second harmonic component. The second direct voltage is dependent on certain of the through alternating currents flowing through the terminals or on the aforesaid second harmonic component depending on the magnitudes thereof.

It is, therefore, an object of the invention to provide an improved differential relay having static components.

It is another object of the invention to provide for an alternating current system or apparatus to be protected, differential protective means and instantaneous current-responsive protective means employing common energizing circuits.

It is a further object of the invention to provide a relay or protective means as defined in each of the preceding two paragraphs having a flared characteristic.

It is also an object of the invention to provide a percentage differential relay having improved means for selecting the largest of a plurality of restraint quantities for restraining operation of the relay.

It is an additional object of the invention to provide a static differential relay for an alternating electric system dependent on selected parts only of alternating quantities derived from the system.

Other objects of the invention will be apparent from the following description, taken in conjunction with the accompanying drawing, in which the single figure is a schematic view of a system employing a percentage differential relay embodying the invention.

As shown in the drawing, a system is provided for establishing a direct voltage $E_O$ across operating terminals represented by terminals of a load resistor 3 which is dependent on internal fault current of apparatus to be protected. This direct voltage $E_O$ is an operating voltage which is employed for operating suitable protective means. The protective means is restrained against operation by a restraint voltage $E_R$ which is a direct voltage appearing across restraining terminals represented by terminals of a load resistor 5. The two voltages $E_O$ and $E_R$ are connected in series opposition in an electrical loop which also includes a resistor 7. Consequently, the current flowing through the resistor 7 and the voltage appearing across the terminals of such resistor depend on the difference between the voltages across the resistors 3 and 5 and thus depend on the difference between the voltages $E_O$ and $E_R$.

The voltage appearing across an adjustable part of the resistor 7 is employed for operating a suitable protective device such as the trip coil 11T of a circuit breaker 11. If the trip coil 11T has adequate sensitivity it may be energized directly by the voltage derived from the resistor 7. Preferably, the trip coil 11T is energized by the output of a suitable amplifier 19 which derives its input from the voltage across a selected part of the resistor 7 through a rectifier RE1.

The voltages $E_R$ and $E_O$ have polarities which are represented in FIG. 1 by positive (+) and negative (−) markings.

The operation of the portion of the drawing which thus far has been described may now be set forth. If the restraint voltage $E_R$ exceeds the operating voltage $E_O$, a current flows through the resistor 7 in a direction such that the rectifier RE1 blocks the flow of current to the input terminals of the amplifier 19. Under these circumstances, the circuit breaker 11 remains closed.

Let it be assumed next that the operating voltage $E_O$ exceeds the restraint voltage $E_R$. The difference between these voltages is now properly poled to produce a flow of current through the rectifier RE1 and the input terminals of the amplifier 19 to trip the circuit breaker 11.

Tripping of the circuit breaker 11 is employed for protecting suitable electrical apparatus or an electrical system. For the purpose of discussion it will be assumed that electrical apparatus to be protected takes the form of an electrical transformer 23 which is a three-phase transformer having primary windings P connected in delta and secondary windings S connected in wye. It will be assumed that the transformer operates at a frequency of 60 cycles per second.

The primary windings P of the transformer 23 are connected to a suitable source of electric energy, and the secondary windings S are connected to a transmission line having line conductors 29, 29B and 29C through the circuit breaker 11.

Information concerning the condition of the phase A of the transformer 23 is obtained from current transformers 31 and 33 which are associated respectively with the leads for the phase A of the three-phase transformer. For the present the discussion will be confined to circuits associated with the phase A. The secondary windings of the two current transformers 31 and 33 are connected to supply current in the same direction in a closed series circuit which includes the primary windings of two restraint transformers 35–1 and 35–2. The terminals of the secondary windings which are connected directly to each other are also connected to ground. The primary winding of an operating transformer 37 is connected between ground and the adjacent terminals of the primary windings of the transformers 35–1 and 35–2. Preferably, the transformers 35–1, 35–2 and 37 have soft magnetic cores provided with air gaps which prevent saturation of the transformer cores over a substantial operating range.

With these connections currents flow through the primary windings of the restraint transformers 35–1 and 35–2 which are dependent on the sum of the phase A currents entering and leaving the transformer 23. The current flowing in the primary winding of the operation transformer 37 is dependent on the difference between the phase A currents entering and leaving the transformer 23. Consequently, the primary current of the transformer 37 represents fault current for a fault within the transformer 23.

The secondary winding of the operating transformer 37 is connected across the input terminals of a rectifier FWR1 through a filter FL1 and across the input terminals of a rectifier FWR2 through a filter FL2. The rectified outputs of the rectifiers FWR1 and FWR2 are applied across the resistors 3 and 5, respectively, through filters FL3 and FL4 to produce the direct operating voltage $E_O$ and the direct restraint voltage $E_R$.

The rectifiers FWR1 and FWR2 may be of any desired construction. For present purposes, they are assumed to be full-wave bridge-type rectifiers.

The filters FL3 and FL4 may be of any desired construction suitable for removing ripple from the rectifier outputs. The specific filter FL3 illustrated in FIG. 1 includes capacitors 45 and 47 on opposite sides of a resistor 49. The filter FL4 is of similar construction.

In an analogous manner, each of the secondary windings of the restraint transformers 35–1 and 35–2 is connected to the input terminals of rectifiers FWR3 and FWR4, respectively, preferably full-wave rectifiers. The outputs of the rectifiers FWR2, FWR3 and FWR4 are all connected in parallel across the resistor 5.

When the transformer 23 is first placed in service, current including a substantial amount of second harmonic current is taken by the transformer for a short period of time. To prevent a false operation of the circuit breaker the filter FL1 is designed to block the flow of second harmonic current to the rectifier FWR1. The filter conveniently includes a capacitor C1 and an inductance coil L1 connected in parallel and proportioned to resonate at 120 cycles per second to block the flow of second harmonic current.

The filter FL2 includes a capacitor C3 and an inductance coil L3 connected in parallel and proportioned to resonate at 60 cycles per second in order to block the flow of fundamental-frequency current (i.e., current having a frequency of 60 cycles per second) and to pass other frequencies. The parallel-tuned circuit comprising the capacitor C3 and the inductance coil L3 is tuned to series resonance with an inductance coil L2 at 120 cycles per second in order to pass second harmonic current freely.

The performance of the system now may be considered for a fault occurring external to the transformer 23 and for a fault occurring internally of the transformer. Let it be assumed first that a fault F1 to ground appears on phase A to the right of the circuit breaker 11. Since this is an external fault, substantially equal currents flow through the transformers 31 and 33 and a substantial restraint voltage appears across the resistor 5.

At the same time, virtually no current flows through the primary winding of the transformer 37 and consequently substantially no voltage is applied through the rectifier FWR1 across the resistor 3. Since a large restraint voltage $E_R$ is present and a small or zero operating voltage $E_O$ is present at this time, the circuit breaker 11 remains closed.

Let it be assumed next that a fault F2 appears in the phase A primary winding inside the transformer 23. A direct restraint voltage $E_R$ appears across the resistor 5 in the manner previously discussed. However, the currents flowing through the primary windings of the transformers 31 and 33 no longer are equal and a substantial difference current consequently flows through the primary winding of the transformer 37. This difference current produces a substantial direct operating voltage $E_O$ across the resistor 3.

It should be noted that the difference current also can supply a voltage across the resistor 5, through the rectifier FWR2. However, since current components of fundamental frequency are blocked by the filter FL2, only relatively small components of harmonic frequencies can supply currents through this filter to the resistor 5, and the restraint voltage $E_R$ consequently is determined essentially by current supplied through the restraint transformers. The operating voltage $E_O$ exceeds the restraint voltage $E_R$ by an amount sufficient to trip the circuit breaker 11 through the amplifier 19.

Finally, let it be assumed that the transformer 23 has just been placed in service and that substantial second harmonic current is present. Second harmonic current is blocked by the filter FL1. Consequently, this second harmonic current cannot produce a voltage across the capacitor 45.

At the same time, second harmonic current flows freely through the filter FL2 and produces a substantial restraint voltage $E_R$. Inasmuch as the restraint voltage $E_R$ exceeds the operating voltage $E_O$, the circuit breaker remains closed.

From the brief analysis, it is clear that the relay system properly discriminates between external and interial faults. If protection is desired only for the phase A, or for a single phase installation, the components associated with the phase A which thus far have been discussed suffice. However, the drawing shows protection for all three phases of the transformer 23. Corresponding components for the three phases are identified by the same reference characters except that the suffixes B and C are added to define components associated respectively with the phases B and C, respectively. For example, the rectifiers FWR1, FWR1B and FWR1C identify corresponding rectifiers associated respectively with the phases A, B and C in analogous manners.

By inspection of the drawing, it will be noted that the rectifiers FWR1, FWR1B and FWR1C are connected in parallel across the capacitor 45. Consequently, the operating voltage $E_O$ corresponds to the largest output voltage of the three associated rectifiers. In a similar manner if a switch SW is closed, the rectifiers FWR3, FWR3B, FWR3C, FWR4, FWR4B, FWR2, FWR2B and FWR2C have their outputs connected in parallel across the input to the filter FL4. For this reason, the restraining voltage $E_R$ appearing across the resistor 5 corresponds to the largest of the output voltages of these associated rectifiers. With the system thus far described, complete differential protection is provided for the transformer 23. With the maximum-voltage networks employed, a differential relay embodying the invention requires less percentage restraint than that provided in percentage-differential relays which do not employ maximum voltage networks.

As previously pointed out, the differential relay may be provided with a flared percentage differential characteristic. Let it be assumed that the switch SW is opened for the purpose of introducing a resistor 8 in parallel with a Zener diode Z between the resistor 5 and the outputs of the rectifiers FWR3, FWR3B, FWR3C, FWR4, FWR4B and FWR4C. For low values of output voltages of the restraint transformer the Zener diode blocks the flow of current therethrough and the resistor 8 restricts the restraint voltage $E_R$ derived from the restraint transformers. As the effective output voltage of the restraint transformers increases, the voltage across the resistor 8 becomes sufficient to break over the Zener diode Z. For larger values of the effective output voltage from the restraint transformers, a larger ratio of operating voltage $E_O$ to such effective output voltage is required to trip the circuit breaker 11, thus providing a flared characteristic.

If desired, the filter FL3 may be provided with a slightly longer time delay than the filter FL4 to assure build-up of the restraint voltage $E_R$ before build-up of the operating voltage $E_O$.

The filter FL3 desirably may be arranged to discharge more rapidly than the filter FL4 to insure that a false tripping operation does not occur when an external fault is cleared.

To provide instantaneous trip for large internal fault currents, a resistor 9 may be connected across the parallel outputs of the rectifiers FWR1, FWR1B and FWR1C through a filter FL5 and a device such as a Zener diode Z1 which exhibits a substantial blocking resistance until the voltage thereacross reaches a substantial breakover value. The filter FL5 is designed to remove ripple from current supplied thereto. When the Zener diode Z1 breaks over a substantial direct voltage appears across the resistor 9. This voltage is applied through a rectifier RE2 across the input terminals of the amplifier 19 to trip the circuit breaker 11.

Thus, when the internal fault current exceeds a predetermined large value determined by the breakover voltage of the Zener diode Z1, the circuit breaker 11 is tripped instantaneously.

Although the invention has been described with reference to certain specific embodiments thereof, numerous modifications falling within the spirit and scope of the invention are possible.

I claim as my invention:

1. In a protective arrangement for an alternating current system having terminals through which alternating current normally enters and leaves the system, operating rectifying means having a direct electric operating output dependent on a function of the difference between alternating current entering and leaving the system through said terminals, restraint rectifying means having a direct electric restraint output dependent on a function of the sum of currents entering and leaving the system through the terminals, and protective translating means independently responsive to the difference between the operating and restraint outputs and to said direct electric operating output.

2. In a protective arrangement for an alternating current system having terminals through which alternating current normally enters and leaves the system, operating rectifying means having a direct electric operating output dependent on a function of the difference between alternating current entering and leaving the system through said terminals, restraint rectifying means having a direct electric restraint output dependent on a function of the sum of currents entering and leaving the system through the terminal, a threshold device having a blocking impedance until the voltage thereacross exceeds a predetermined value and thereafter having a much smaller impedance, first and second rectifiers, protective electroresponsive translating means connected for energization in accordance with the difference between the operating and restraint outputs through the first rectifier, and means connecting the translating means for energization through the second rectifier and the threshold device in accordance with the operating output, said first and second rectifiers being poled to prevent current supplied to the translating means through one of said first and second rectifiers from passing through the other of said first and second rectifiers.

3. In a protective arrangement for an alternating current system having terminals through which alternating current normally enters and leaves the system, operating rectifying means having a direct operating output dependent on a function of the difference between alternating current entering and leaving the system through said terminals, restraint rectifying means having a direct restraint output dependent on a function of the sum of currents entering and leaving the system through the terminals, an impedance device connected in series with the direct restraint output to provide a second direct restraint output, said impedance device comprising a threshold device and a resistor connected in parallel, said threshold device exhibiting a substantial blocking resistance until the voltage thereacross exceeds a predetermined value for which the resistance is substantially less than the blocking value, and protective electroresponsive translating means responsive to the difference between the operating and second restraint outputs.

4. In a protective arrangement for an alternating current system having terminals through which alternating current normally enters and leaves the system, operating rectifying means having a direct electric operating output dependent on a function of the difference between alternating current entering and leaving the system through said terminals, restraint rectifying means having a direct electric restraint output dependent on a function of the sum of currents entering and leaving the system through the terminals, said restraint rectifying means being responsive to a decrease in the currents entering and leaving the system through the terminals for decreasing said direct electric restraint output in a time which is larger than the time required for the direct electric operating output to decrease in response to a decrease in said difference, and protective electroresponsive translating means responsive to the difference between the operating and restraint outputs.

5. In a protective arrangement for a polyphase alternating current system having a plurality of phases each having terminals through which alternating current normally enters and leaves the system, separate operating rectifying means for each of said phases for providing a direct phase operating voltage dependent on a function of the difference between the fundamental-frequency component of alternating currents entering and leaving the system through the associated phase terminals, separate restraint rectifying means for each of said phases for providing a direct phase restraint voltage dependent on a function of harmonic component of currents entering and leaving the system through the associated phase terminals, and translating means responsive to the difference between the maximum of said direct phase operating voltages and the maximum of said direct phase restraining voltages.

6. An arrangement as claimed in claim 5 in combination with means responsive to any of said direct phase operating voltages in excess of a predetermined value for operating said translating means.

7. An arrangement as claimed in claim 5 in combination with threshold means responsive to the direct phase operating voltages for producing an auxiliary output voltage when any of said direct phase operating voltages exceeds a threshold value, said translating means being independently responsive to said auxiliary output voltage.

8. In a protective arrangement for a polyphase alternating current system having a plurality of phases each having terminals through which alternating current normally enters and leaves the system, separate operating rectifying means for each of said phases for providing a direct phase operating voltage dependent on a function of the difference between the fundamental-frequency component of alternating currents entering and leaving the system through the associated phase terminals, separate restraint rectifying means for each of said phases for providing a direct phase restraint voltage dependent on a function of harmonic components of currents entering and leaving the system through the associated phase terminals, derivation means for deriving from the direct phase operating voltages a direct maximum operating voltage dependent on the maximum of the direct phase operating voltages, derivation means for deriving from the direct phase restraint voltages a direct maximum restraint voltage dependent on the maximum of said phase restraint voltages, said derivation means having decay times effective upon deenergization thereof for causing the direct maximum restraint voltage to decay at a rate slower than the decay rate of the direct maximum operating voltage, means for deriving a resultant direct voltage dependent on the difference between said maximum operating voltage and said maximum restraint voltage, and translating means responsive to said resultant direct voltage.

9. In a protective arrangement for a polyphase alternating current system having a plurality of phases each having terminals through which alternating current normally enters and leaves the system, separate operating rectifying means for each of said phases for providing a direct phase operating voltage dependent on a function of the difference between the fundamental-frequency component of alternating currents entering and leaving the system through the associated phase terminals, separate restraint rectifying means for each of said phases for providing a direct phase restraint voltage dependent on a function of harmonic component of currents entering and leaving the system through the associated phase terminals, derivation means for deriving from the direct phase operating voltages a direct maximum operating voltage dependent on the maximum of the direct phase operating voltages, derivation means for deriving from the direct phase restraint voltages a direct maximum restraint voltage dependent on the maximum of said phase restraint voltages, means for deriving a resultant direct voltage dependent on the difference between said maximum operating voltage and said maximum restraint voltage, and translating means responsive to said resultant direct voltage, threshold means responsive to the direct phase operating voltages for producing an auxiliary output voltage when any of said direct phase operating voltages exceeds a threshold value, and translating means independently responsive to said resultant direct voltage and said auxiliary output voltage.

10. In a protective arrangement for a polyphase alternating current system having a plurality of phases each having terminals through which alternating current normally enters and leaves the system, separate operating rectifying means for each of said phases for providing a direct phase operating voltage dependent on a function of the difference between the fundamental-frequency component of alternating currents entering and leaving the system through the associated phase terminals, separate restraint rectifying means for each of said phases for providing a direct phase restraint voltage dependent on a function of harmonic component of currents entering and leaving the system through the associated phase terminals, separate restraint rectifying means for each of said phases for providing a direct phase restraint voltage dependent on a function of the sum of currents entering and leaving the system through the associated phase terminals, and translating means responsive to the difference between the maximum of said direct phase operating voltages and the maximum of said direct phase restraining voltages.

References Cited by the Examiner
UNITED STATES PATENTS

| | | | |
|---|---|---|---|
| 1,929,059 | 10/1933 | FitzGerald | 317—27 |
| 2,384,375 | 9/1945 | Hayward | 317—53 |
| 2,863,100 | 12/1958 | Rice | 317—27 |

SAMUEL BERNSTEIN, *Primary Examiner.*